United States Patent
Schuler et al.

(10) Patent No.: US 9,608,544 B2
(45) Date of Patent: Mar. 28, 2017

(54) ENERGY SUPPLY SYSTEM COMPRISING AN ENERGY STORAGE DEVICE AND METHOD FOR ACTUATING COUPLING DEVICES OF THE ENERGY STORAGE DEVICE

(71) Applicant: Robert Bosch GmbH, Stuttgart (DE)

(72) Inventors: Klaus-Juergen Schuler, Leingarten (DE); Andreas Mittag, Markgroeningen (DE); Thomas Zeltwanger, Ingersheim (DE); Manfred Grabs, Wiernsheim (DE)

(73) Assignee: Robert Bosch GmbH, Stuttgart (DE)

( * ) Notice: Subject to any disclaimer, the term of this patent is extended or adjusted under 35 U.S.C. 154(b) by 56 days.

(21) Appl. No.: 14/427,538

(22) PCT Filed: Jul. 30, 2013

(86) PCT No.: PCT/EP2013/065951
§ 371 (c)(1),
(2) Date: Mar. 11, 2015

(87) PCT Pub. No.: WO2014/040787
PCT Pub. Date: Mar. 20, 2014

(65) Prior Publication Data
US 2015/0236614 A1    Aug. 20, 2015

(30) Foreign Application Priority Data

Sep. 14, 2012 (DE) .................. 10 2012 216 469

(51) Int. Cl.
*H02M 7/5387* (2007.01)
*H02M 7/537* (2006.01)

(52) U.S. Cl.
CPC .................. *H02M 7/537* (2013.01)

(58) Field of Classification Search
CPC ..... H02M 7/537; H02M 7/5387; H02M 7/797
(Continued)

(56) References Cited

U.S. PATENT DOCUMENTS 5,642,275 A    6/1997    Peng et al.
8,345,455 B2 *    1/2013    Jeon .................. H02M 7/49
                                               363/132

(Continued)

FOREIGN PATENT DOCUMENTS

CN    201774263    3/2011
CN    102013690    4/2011
(Continued)

OTHER PUBLICATIONS

International Search Report for Application No. PCT/EP2013/065951 dated Sep. 8, 2014 (English Translation, 2 pages).

*Primary Examiner* — Jeffrey Sterrett
(74) *Attorney, Agent, or Firm* — Michael Best & Friedrich LLP (57) ABSTRACT

The invention relates to an energy supply system having an energy storage device. The energy storage device has a plurality of energy storage modules that are serially connected in at least one energy supply branch, each comprising an energy storage cell module having at least one energy storage cell, and a coupling device having coupling elements configured to selectively switch the energy storage cell module into the respective energy supply branch, or to circumvent same, and comprising a plurality of driver devices, each dedicated to one of the energy storage modules, and coupled to one of the energy storage modules, and which are configured to actuate the coupling elements of the coupling devices according to a driver signal. The energy supply system further comprises a control device, which is coupled to the driver devices by way of a control signal line, and which is configured to emit a control signal to the driver (Continued)

devices by way of the control signal line, which is provided with a physical control signal parameter, into the value of which a control mode for the driver devices is coded. The driver devices are configured to receive the control signal, and to generate the respective driver signal subject to the value of the control signal parameter, and a control mode assignment that can be predetermined.

12 Claims, 2 Drawing Sheets

(58) Field of Classification Search
USPC .......................................... 363/71, 131, 132
See application file for complete search history.

(56) References Cited

U.S. PATENT DOCUMENTS

| | | | | |
|---|---|---|---|---|
| 8,547,718 | B2* | 10/2013 | Katoh | H02M 1/088 363/131 |
| 8,611,114 | B2* | 12/2013 | Hiller | H02M 7/49 363/131 |
| 9,013,901 | B2* | 4/2015 | Hosini | H02M 7/5387 363/65 |
| 2003/0231517 | A1* | 12/2003 | Bixel | H02M 5/4585 363/71 |
| 2013/0258726 | A1* | 10/2013 | Mukherjee | H02J 3/36 363/40 |
| 2014/0078797 | A1* | 3/2014 | Mihalache | H02M 7/49 363/71 |
| 2014/0293668 | A1* | 10/2014 | Trainer | H02M 7/5388 363/71 |
| 2015/0171769 | A1* | 6/2015 | Geyer | H02M 7/483 363/71 |
| 2015/0236614 | A1* | 8/2015 | Schuler | H02M 7/537 363/131 |

FOREIGN PATENT DOCUMENTS

| | | |
|---|---|---|
| CN | 102013694 | 4/2011 |
| CN | 102148579 | 8/2011 |
| CN | 102664535 | 9/2012 |
| DE | 102010027857 | 10/2011 |
| DE | 102010027861 | 10/2011 |
| WO | 2012060250 | 5/2012 |

* cited by examiner

ENERGY SUPPLY SYSTEM COMPRISING AN ENERGY STORAGE DEVICE AND METHOD FOR ACTUATING COUPLING DEVICES OF THE ENERGY STORAGE DEVICE

BACKGROUND OF THE INVENTION

The invention relates to an energy supply system and to a method for actuating coupling devices of an energy storage device, in particular an energy storage device comprising a modular battery system.

It would appear that in the future electronic systems which combine novel energy storage technologies with electrical drive technology or with electrical supply grids will be used increasingly both in stationary applications, such as wind turbines or solar systems, for example, and in vehicles, such as hybrid or electric vehicles and ships.

Feeding single-phase or polyphase current into an electrical machine or electrical supply grid is generally effected by means of a converter in the form of a pulse-controlled inverter. For this purpose, a DC voltage provided by a DC link can be converted into a single-phase or polyphase AC voltage, for example a three-phase AC voltage. The DC link is in this case fed from a string of battery modules connected in series. In order to be able to meet the requirements in respect of power and energy which are set for a specific application, a plurality of battery modules are often connected in series in a traction battery.

The publication U.S. Pat. No. 5,642,275 A1 describes a battery system with an integrated inverter function. Systems of this type are known under the name multilevel cascaded inverter or battery direct inverter (BDI). Such systems comprise DC sources in a plurality of energy storage module strings, which are connectable directly to an electrical machine or an electrical grid. In this case, single-phase or polyphase supply voltages can be generated. The energy storage module strings in this case have a plurality of series-connected energy storage modules, wherein each energy storage module has at least one battery cell and an associated controllable coupling unit, which makes it possible to interrupt the respective energy storage module string or to bypass the respectively associated at least one battery cell or to switch the respectively associated at least one battery cell into the respective energy storage module string, depending on control signals. By suitable actuation of the coupling units, for example with the aid of pulse width modulation, suitable phase signals for controlling the phase output voltage can also be provided, with the result that it is possible to dispense with a separate pulse-controlled inverter. The pulse-controlled inverter required for controlling the phase output voltage is therefore integrated in the BDI, so to speak.

Similar systems are disclosed in the publications DE 10 2010 027 857 A1 and DE 10 2010 027 861 A1, which disclose, for example, battery direct inverters comprising a plurality of battery module strings, which are connectable directly to an electrical machine.

BDIs generally have a higher degree of efficiency and a higher degree of failsafety in comparison with conventional systems. The failsafety is ensured, inter alia, by virtue of the fact that defective battery cells, failed battery cells or battery cells which are not operating at full capacity can be removed from the energy supply strings by suitable bypassing actuation of the coupling units. The phase output voltage of an energy storage module string can be varied, and in particular adjusted stepwise, by corresponding actuation of the coupling units. The graduation of the output voltage in this case results from the voltage of a single energy storage module, wherein the maximum possible phase output voltage is determined by the sum of the voltages of all of the energy storage modules in an energy storage module string.

In order to adjust an output voltage of an energy storage module, a pulse-width-modulated (PWM) actuation of the coupling units can take place. As a result, it is possible to output a desired average as energy storage module voltage by targeted variation of the switch-on or switch-off times.

A requirement for BDIs or modular energy storage devices consists in actuating the coupling units of the individual energy storage modules quickly, flexibly, reliably, with energy efficiency and at low cost. As the number of energy storage modules increases, this requirement becomes increasingly difficult.

Therefore, there is a need for actuation for coupling devices of modular energy storage devices in which the power electronics of the individual energy storage modules can be actuated with a high level of accuracy, at high speed, with as much flexibility as possible and with little implementation complexity being involved.

SUMMARY OF THE INVENTION

The present invention in accordance with one aspect provides an energy supply system comprising an energy storage device. The energy storage device has a multiplicity of energy storage modules which are connected in series in at least one energy supply branch and which each comprise an energy storage cell module, which has at least one energy storage cell, and a coupling device comprising coupling elements, which are configured to switch the energy storage cell module selectively into the respective energy supply branch or to bypass said energy storage cell module, and a multiplicity of driver circuits, which are each assigned to one of the energy storage modules and are coupled to the in each case one of the energy storage modules, and which are configured to actuate the coupling elements of the coupling devices in accordance with a driver signal. The energy supply system furthermore comprises a control device, which is coupled via a control signal line to the driver devices, and which is configured to output a control signal to the driver devices via the control signal line, which control signal has a physical control signal parameter, with a control mode for the driver devices being encoded in the value of said control signal parameter. In this case, the driver devices are configured to receive the control signal and to generate the respective driver signal depending on the value of the control signal parameter and a presettable control mode assignment.

In accordance with a further aspect, the present invention provides a method for actuating coupling devices of an energy storage device, which has a multiplicity of energy storage modules connected in series in at least one energy supply branch. The energy storage modules comprise in each case one energy storage cell module, which has at least one energy storage cell, and a coupling device comprising coupling elements, which are configured to switch the energy storage cell module selectively into the respective energy supply branch or to bypass said energy storage cell module. In this case, the method has the steps of generating a control signal, which has a physical control signal parameter, with a control mode for the driver devices being encoded in the value of said control signal parameter, of transmitting the control signal to driver devices, which are each assigned to one of the energy storage modules and are coupled to the in each case one of the energy storage modules, and which are configured to actuate the coupling elements of the coupling devices in accordance with a driver signal, via a control signal line, and of generating a respective driver signal for the coupling elements of the coupling devices by means of the driver devices depending on the value of the control signal parameter and a presettable control mode assignment.

One concept of the present invention consists in ensuring the actuation of the power electronics component parts in a manner which is as efficient, quick, precise and flexible as possible in a modular energy storage device comprising battery cells which are connected in series in one or more energy supply branches. For this purpose, a control device is provided, said control device communicating with the driver devices assigned to the respective energy storage modules of the energy storage device via a control line. A control signal can be transmitted to all of the driver devices via this control line, said control signal having a physical property, with an actuation behavior of the driver devices being encoded in the value or variation of said physical property.

One advantage of the actuation according to the invention consists in that only one control line is provided, via which, in serial sequence, the control signal is supplied to all of the driver devices in an energy supply branch. As a result, the hardware complexity involved is reduced, in particular since the number of energy storage modules or associated driver devices can be matched flexibly without the control line topology needing to be changed in principle. In addition, a synchronicity of the actuation of the driver devices can be ensured by the one control line.

Moreover, there is the advantage that standardized control signal types can be used, so that the implementation is flexible, inexpensive and subject to few faults. With the procedure according to the invention, high update frequencies of the actuation signals for the driver devices are possible without expensive or special hardware components being required for the communication with the driver devices. In particular, the evaluation of the control signal in the driver devices is possible quickly, without any problems and without the need for extensive matching to the type of control signal.

The actuation enables very short latency times. In addition, advantageously a theoretically unlimited number of energy storage modules is possible, whose practical maximum number is merely dependent on the required resolution and the processing speed of the control signal by the driver devices. Furthermore, the procedure according to the invention ensures safe states in the event of a fault, for example in the event of wire breakage of the control line or the feedlines to the driver devices.

Furthermore, synchronization of the energy storage modules via edge signals is possible. The transmission of the control signals is advantageously robust and can be performed with galvanic isolation via suitable components, for example optocouplers. All of the communication between the control device and the driver devices requires only a small amount of arithmetic capability so that the software of the driver devices and the control device takes up few resources.

In accordance with one embodiment of the energy supply system according to the invention, the energy supply system can furthermore comprise a configuration line, which couples the control device to the driver devices, wherein the control device is configured to output a configuration signal via the configuration line to the driver devices, which configuration signal configures the respective presettable control mode assignment of the driver devices. This provides the advantage that configuration data with few requirements in respect of the speed of the updating can be transmitted to the driver devices via the separate configuration line. As a result, conventional bus systems, such as, for example, a CAN bus or a LIN bus, can be used for the configuration of the driver devices.

In accordance with a further embodiment of the energy supply system according to the invention, the energy supply system can furthermore comprise a reset line, which couples the control device to the driver devices, wherein the control device is configured to output a reset signal via the reset line to the driver devices, which reset signal sets all of the coupling elements of the coupling devices to the open state. Advantageously, the safety can thus be ensured in the event of a fault.

In accordance with a further embodiment of the energy supply system according to the invention, the energy supply system can furthermore comprise a feedback line which, together with the control signal line, forms a feedback loop for the control device, wherein the control device is configured to receive the control signal via the feedback line and to check, depending on the fed-back control signal, whether the control signal is output fault-free to all of the driver devices and there is no defect in the control signal line. This makes it possible to determine defects and failures more easily and possibly to adjust the control signal in the case of propagation time differences.

In accordance with a further embodiment of the energy supply system and method according to the invention, the control signal can be a pulse-width-modulated digital signal, and the physical control signal parameter can be the pulse width of the pulse-width-modulated digital signal. By means of pulse-width-modulated control signals, high update frequencies are possible, with the result that information relating to verification can also be transmitted a plurality of times during a switching period of the coupling devices. This enables averaging of the detection of the control signal parameter, as a result of which the probability of errors is reduced and the actuation becomes more robust.

In accordance with a further embodiment of the energy supply system and method according to the invention, the control signal can be a frequency-modulated digital signal, and the physical control signal parameter can be the frequency of the frequency-modulated digital signal.

In accordance with a further embodiment of the energy supply system and method according to the invention, the control signal can be an analog voltage signal, and the physical control signal parameter can be the voltage value of the analog voltage signal.

In accordance with a further embodiment of the energy supply system and method according to the invention, the control signal can be a serially transmitted digital bit string, for example via RS 232, and the physical control signal parameter can be encoded in the bit string.

In accordance with one embodiment of the method according to the invention, the method can furthermore comprise the step of generating a configuration signal, which is output via a configuration line to the driver devices, wherein the configuration signal configures the respective presettable control mode assignment of the driver devices.

In accordance with a further embodiment of the energy supply system according to the invention, the coupling devices can comprise coupling elements in a full-bridge circuit. Alternatively, the coupling devices can comprise coupling elements in a half-bridge circuit. In accordance with a further embodiment of the energy supply system according to the invention, the energy storage cells can comprise lithium-ion rechargeable batteries. Thus, the actuation according to the invention is particularly suitable for fast-switching battery direct inverters (BDIs) or battery direct converters (BDCs). In this case, all other types of batteries, rechargeable batteries, capacitors and voltage sources are of course also possible, in the same way as the actuation according to the invention is also suitable for other energy supply systems connected in series in modular fashion.

BRIEF DESCRIPTION OF THE DRAWINGS

Further features and advantages of embodiments of the invention are set forth in the description below with reference to the attached drawings.

DETAILED DESCRIPTION

Figure 1:
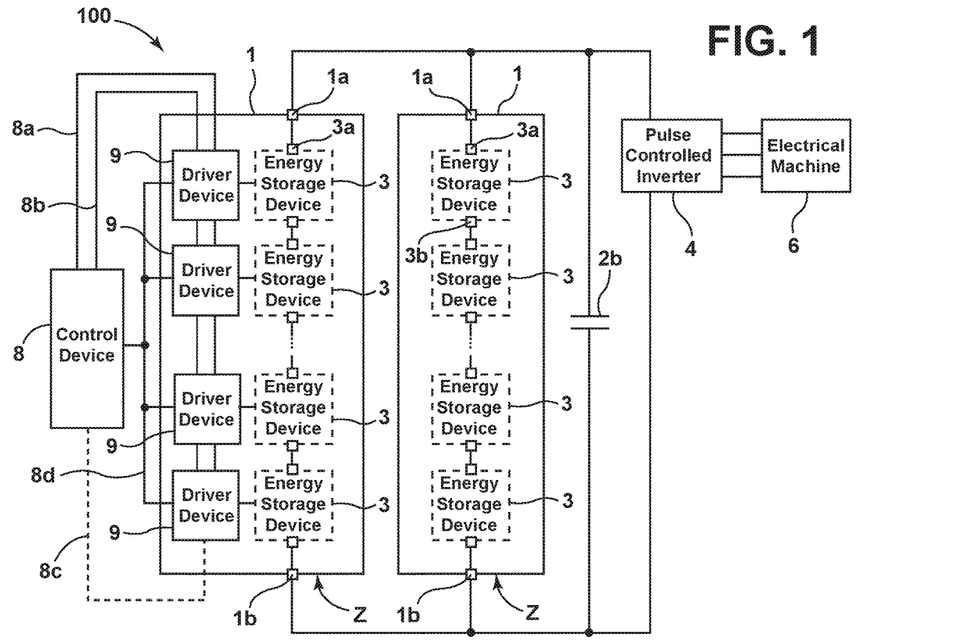
FIG. 1 shows a schematic illustration of an electrical energy supply system comprising an energy storage device in accordance with one embodiment of the present invention.

FIG. 1 shows an electrical energy supply system 100 for voltage conversion of DC voltage provided by energy storage modules 3 into an n-phase AC voltage. The energy supply system 100 comprises an energy storage device 1 comprising energy storage modules 3, which are connected in series into one or more energy supply strings or energy supply branches Z. The energy supply branches Z are each coupled between two output connections 1a and 1b of the energy storage device 1, which two output connections are each coupled to a DC link 2b. By way of example, the energy supply system 100 in FIG. 1 is used for feeding a three-phase electrical machine 6. However, provision can also be made for the energy storage device 1 to be used for generating electric current for an energy supply grid 6. Alternatively, the electrical machine 6 can also be a synchronous or asynchronous machine, a reluctance machine or a brushless DC motor (BLDC). In this case, it may also be possible for the energy storage device 1 to be used in stationary systems, for example in power plants, in electrical energy recovery units such as wind turbines, photovoltaic systems or combined heat and power generation plants, in energy storage plants such as, for example, compressed-air storage power stations, battery storage power stations, flywheel storage devices, pumped-storage devices or similar systems. A further use possibility for the system in FIG. 1 consists in vehicles for the transport of people and goods which are designed for transport on or below the water, for example ships, motor boats or the like.

For this purpose, each of the energy supply branches Z of the energy storage device 1 is possibly coupled to the DC link 2b via a coupling inductance (not illustrated). The coupling inductances can be, for example, inductors which are connected in a targeted manner between the DC link 2b and the output connection 1a of the energy storage device 1. Alternatively, it may also be possible for the coupling inductances to be formed by parasitic inductances present in any case in the circuitry between the energy storage device 1 and the DC link 2b.

The DC link 2b feeds a pulse-controlled inverter 4, which provides a single-phase or polyphase AC voltage for the electrical machine 6 from the DC voltage of the DC link 2b.

The number of energy supply branches Z in FIG. 1 is, by way of example, two, wherein any other number of energy supply branches Z is likewise possible, however. The energy supply branches Z of the energy storage device 1 have at least two series-connected energy storage modules 3. By way of example, the number of energy storage modules 3 in FIG. 1 is four, but any other number of energy storage modules 3 per energy supply branch is likewise possible. The energy storage modules 3 each have two output connections 3a and 3b, via which a module output voltage of the energy supply modules 3 can be provided. Since the energy storage modules 3 are primarily connected in series, the module output voltages of the energy storage modules 3 summate to the total output voltage which is provided at the output connections 1a, 1b of the energy supply branches Z of the energy storage device 1.

Figure 2:
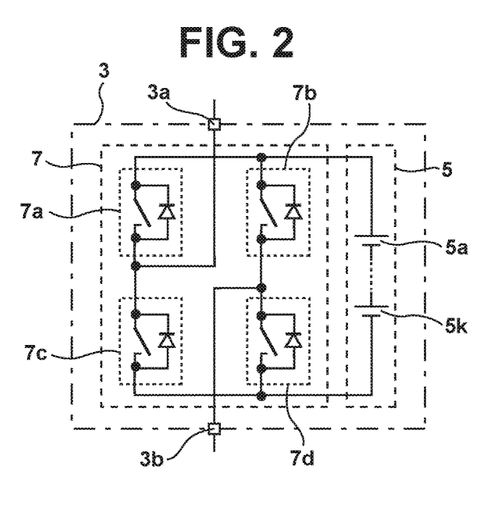
FIG. 2 shows a schematic illustration of an exemplary embodiment of an energy storage module of an energy storage device shown in FIG. 1.
Figure 3:
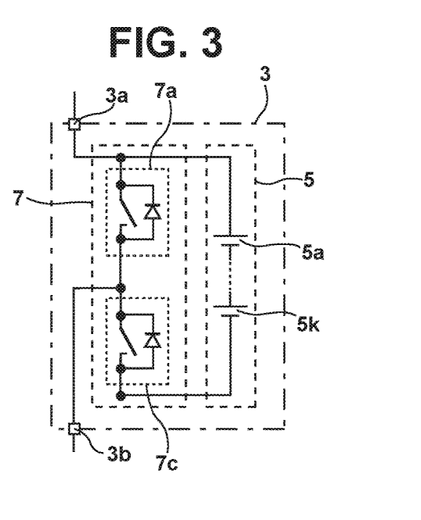
FIG. 3 shows a schematic illustration of a further exemplary embodiment of an energy storage module of an energy storage device shown in FIG. 1.

Exemplary designs of the energy storage modules 3 are shown in greater detail in FIGS. 2 and 3. The energy storage modules 3 each comprise a coupling device 7 having a plurality of coupling elements 7a and 7c and possibly 7b and 7d. The energy storage modules 3 furthermore each comprise an energy storage cell module 5 comprising one or more series-connected energy storage cells 5a, 5k.

The energy storage cell module 5 can in this case have, for example, series-connected energy storage cells 5a to 5k, for example lithium-ion batteries or rechargeable batteries. In this case, the number of energy storage cells 5a to 5k in the energy storage module 3 shown in FIG. 2 is two, by way of example, but any other number of energy storage cells 5a to 5k is likewise possible. It is likewise possible for secondary cells with different cell chemistry to be used for the energy storage cells 5a to 5k, for example lead-acid batteries, nickel metal-hydride rechargeable batteries, nickel-cadmium rechargeable batteries, lithium-polymer rechargeable batteries or the like. Furthermore, double-layer capacitors or supercapacitors can also be used for the energy storage cells 5a to 5k.

The energy storage cell modules 5 are connected to input connections of the associated coupling device 7 via connecting lines. The coupling device 7 is, by way of example, in the form of a full-bridge circuit comprising in each case two coupling elements 7a, 7c and two coupling elements 7b, 7d, in FIG. 2. The coupling elements 7a, 7b, 7c, 7d can in this case each have an active switching element, for example a semiconductor switch, and a freewheeling diode connected in parallel therewith. The semiconductor switches can have field-effect transistors (FETs), for example. In this case, the freewheeling diodes can also be integrated in the semiconductor switches.

The coupling elements 7a, 7b, 7c, 7d in FIG. 2 can be actuated, for example with the aid of the control device 8 in FIG. 1, in such a way that the energy storage cell module 5 is switched selectively between the output connections 3a and 3b or that the energy storage cell module 5 is bypassed. For example, the energy storage cell module 5 can be switched in the forward direction between the output connections 3a and 3b by virtue of the coupling element 7d at the bottom right and the coupling element 7a at the top left being moved into a closed state, while the two remaining coupling elements are moved into an open state. A bypass state can be set, for example, by virtue of the two coupling elements 7a and 7b being set to the closed state while the two coupling elements 7c and 7d are kept in the open state.

By suitable actuation of the coupling devices 7, individual energy storage cell modules 5 of the energy storage modules 3 can therefore be integrated in the series circuit of an energy supply branch Z in a targeted manner.

FIG. 3 shows a further exemplary embodiment of an energy storage module 3. The energy storage module 3 shown in FIG. 3 differs from the energy storage module 3 shown in FIG. 2 only in that the coupling device 7 has two instead of four coupling elements, which are interconnected in a half-bridge circuit instead of a full-bridge circuit.

In the variant embodiments illustrated, the active switching elements can be in the form of power semiconductor switches, for example in the form of IGBTs (insulated-gate bipolar transistors), JFETs (junction field-effect transistors) or MOSFETs (metal-oxide semiconductor field-effect transistors).

The output voltage of each of the energy supply branches Z can be varied by means of the coupling elements 7a, 7b, 7c, 7d via suitable actuation in stages from a negative maximum value up to a positive maximum value. The graduation of the voltage levels in this case results depending on the graduation of the individual energy storage cell modules 5. In order to obtain an average voltage value between two voltage stages preset by the graduation of the energy storage cell modules 5, for example, the coupling elements 7a, 7b, 7c, 7d of an energy storage module 3 can be actuated in clocked fashion, for example using pulse width modulation (PWM), with the result that the energy storage module 3 in question produces a module voltage, when averaged over time, which can have a value of between 0 and the maximum possible module voltage determined by the energy storage cells 5a to 5k.

Once again referring to FIG. 1, the energy supply system 100 can furthermore comprise a control device 8, which is connected to the energy storage device 1 and with the aid of which the energy storage device 1 can be controlled in order to provide the desired total output voltage of the energy storage device 1 at the respective output connections 1a, 1b. In addition, the control device 8 can be configured to actuate the respective coupling elements or active switching elements of the energy storage device 1 during charging of the energy storage cells of the energy storage device 1.

For this purpose, the energy storage device 1 has a multiplicity of driver devices 9, which are each assigned to one of the energy storage modules 3 and are coupled thereto. The driver devices 9 are configured to actuate the coupling elements 7a, 7b; 7c, 7d of the coupling devices 7 in accordance with a driver signal. The driver signal can in this case be generated depending on a control signal generated by the control device 8. In this case, the control signal is output by the control device 8 via a control signal line 8a to the driver devices 9. The control signal has a physical control signal parameter S, with a control mode for the driver devices 9 being encoded in the value of said control signal parameter. The driver devices 9 are configured to receive the control signal and to generate the respective driver signal depending on the value of the control signal parameter S and a presettable control mode assignment.

By way of example, only driver devices 9 for one of the energy supply branches Z is shown in FIG. 1. However, it may also be possible for a plurality of or all of the energy supply branches Z of the energy supply system 100 to be configured with driver devices 9.

The control signal can be, for example, a pulse-width-modulated digital signal, wherein the physical control signal parameter S is the pulse width of the pulse-width-modulated digital signal. As an alternative to this, the control signal may be a frequency-modulated digital signal, wherein the physical control signal parameter S is the frequency of the frequency-modulated digital signal. A further possibility consists in that the control signal is an analog voltage signal, wherein the physical control signal parameter S is the voltage value of the analog voltage signal. In addition, there is the possibility that the control signal is a serially transmitted digital bit string, for example via RS 232, wherein the physical control signal parameter S is encoded in the bit string.

In general terms, a signal type can be selected for the control signal, which signal type has signal properties which firstly can be varied in a targeted manner and secondly can be translated back into a transmitted information value by means of corresponding acquisition logic. As a result, using the control signal, control information relating to the required or desired actuation mode for the driver devices can be transmitted.

The energy supply system 100 can furthermore have a possibly bidirectional configuration line 8d, which couples the control device 8 to the driver devices 9. The control device 8 can output a configuration signal to the driver devices 9 via the configuration line 8d, which configuration signal configures the respective presettable control mode assignment of the driver devices 9. Information which is not time-critical or is less time-critical and which relates to temperature, state of charge, module voltage or the like can be transmitted to or from the driver devices 9 via the configuration line 8d, which may be, for example, a CAN bus or a LIN bus. Via this configuration line 8d, the control device 8 can divide the energy storage modules 3 into branch voltage regions, for which the latter are provided in the energy supply branches Z in the case of stepwise connection and disconnection of energy storage cell modules 5.

Furthermore, the energy supply system 100 can have a reset line 8b, which couples the control device 8 to the driver devices 9. The control device 8 can output a reset signal to the driver devices 9 via the reset line 8b, which reset signal sets all of the coupling elements 7a; 7b; 7c; 7d of the coupling devices 7 into the open state, i.e. a freewheeling state. As an alternative to this, the freewheeling state can also be settable via a specific control signal parameter range of the control signal so that it is possible to dispense with a separate reset line 8b.

Furthermore, the energy supply system 100 can have a feedback line 8c, which, together with the control signal line 8a, forms a feedback loop for the control device 8. The control signal can be received by the control device 8 via the feedback line 8c once it has passed the control signal line 8a, with the result that it is possible to check, depending on the fed-back control signal, whether the control signal is output to the driver devices 9 in a fault-free manner. This information can be used to adjust the control signal in the case of discrepancies or faults.

Figure 4:
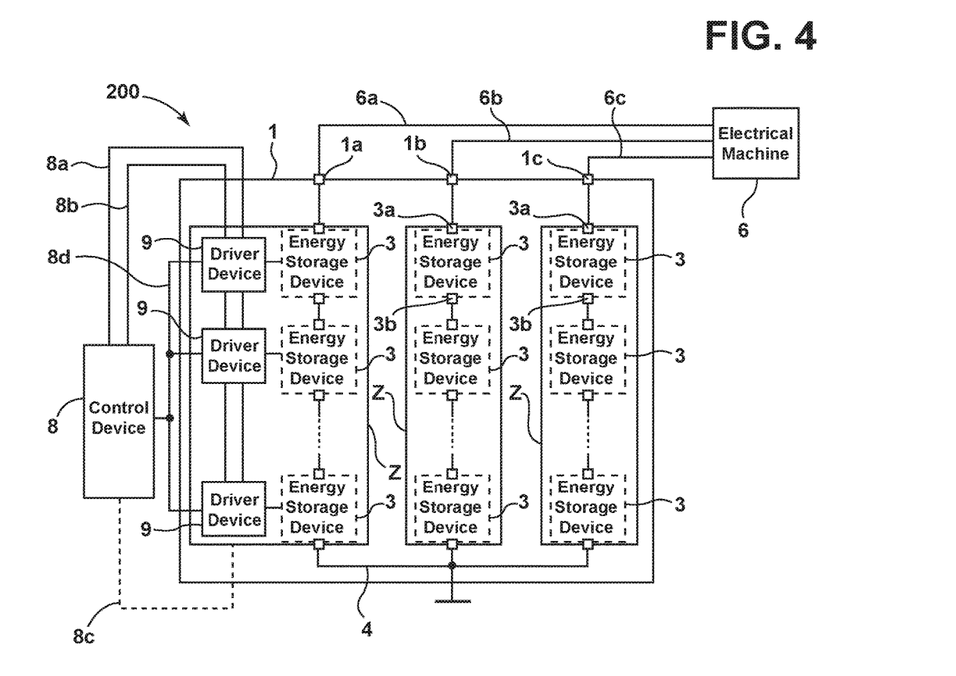
FIG. 4 shows a schematic illustration of an electrical energy supply system comprising an energy storage device in accordance with a further embodiment of the present invention.

FIG. 4 shows a further electrical energy supply system or drive system 200 for voltage conversion of DC voltage provided by energy storage modules 3 into an n-phase AC voltage. The energy supply system 200 comprises an energy storage device 1 comprising energy storage modules 3, which are connected in series into energy supply branches Z. By way of example, FIG. 4 shows three energy supply branches Z, which are suitable for generating a three-phase AC voltage, for example for a three-phase machine. However, it is clear that any other number of energy supply branches may likewise be possible. The energy storage device 1 has an output connection 1*a*, 1*b*, 1*c* at each energy supply branch, each of which output connections is connected to a respective phase line 6*a*, 6*b* or 6*c*, which phase lines couple the energy storage device 1 to an electrical machine 6. By way of example, the energy supply system 200 in FIG. 4 is used for feeding a three-phase electrical machine 6. However, provision can also be made for the energy storage device 1 to be used for generating electric current for an energy supply grid 6. Alternatively, the electrical machine 6 can also be a synchronous or asynchronous machine, a reluctance machine or a brushless DC motor (BLDC). In this case, it may also be possible for the energy storage device 1 to be used in stationary systems, for example in power stations, in electrical recovery plants such as, for example, wind turbines, photovoltaic systems or combined heat and power generation plants, in energy storage plants such as, for example, compressed-air storage power plants, battery storage power plants, flywheel storage devices, pumped-storage devices or similar systems. A further use possibility for the system in FIG. 4 is vehicles for transporting people or goods which are configured for transport on or below the water, for example ships, motor boats or the like.

The energy supply system 200 can furthermore comprise a control device 8, which is connected to the energy storage device 1 and with the aid of which the energy storage device 1 can be controlled in order to provide the desired output voltages at the respective output connections 1*a*, 1*b*, 1*c*. In this case, the control device 8 can operate in the same way as the control device 8 in FIG. 1 and as explained above. For this purpose, driver devices 9 can be provided for one or more of the energy supply branches Z of the energy supply system 200 in a similar way as in the case of the energy supply system 100.

The energy supply branches Z can be connected at their end to a reference potential 4 (reference rail). Said energy supply branches can conduct an average potential, in relation to the phase lines 6*a*, 6*b*, 6*c* of the electrical machine 6, and can be connected to a ground potential, for example. Each of the energy supply branches Z has at least two series-connected energy storage modules 3. By way of example, the number of energy storage modules 3 per energy supply branch in FIG. 4 is three, but any other number of energy storage modules 3 is likewise possible. Preferably, in this case each of the energy supply branches Z comprises the same number of energy storage modules 3, but it is also possible for a different number of energy storage modules 3 to be provided for each energy supply branch Z. The energy storage modules 3 can in this case correspond to the energy storage modules shown in connection with FIGS. 2 and 3.

Figure 5:
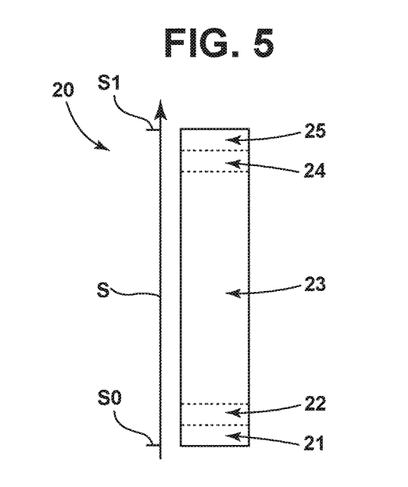
FIG. 5 shows a schematic illustration of a control signal assignment to various parameter ranges of a control signal in accordance with a further embodiment of the present invention.

FIG. 5 shows an exemplary illustration of a control signal assignment 20 to various parameter ranges of a control signal. The control signal has a physical control signal parameter S, whose value can be adjusted flexibly and in a targeted manner, for example, between two boundary values S0 and S1. FIG. 5 will be explained using the example of a pulse-width-modulated digital signal, whose physical control signal parameter S is the pulse width, which is adjustable between S0=0% and S1=100%. In this case, 0% corresponds to a permanently low logic signal, while 100% corresponds to a permanently high logic signal. The values between 0% and 100% can in this case be divided into different parameter ranges 21, 22, 23, 24 and 25.

The driver devices 9 can determine the value of the control signal parameter S via time acquisition, for example. It may also be possible for values of the control signal parameter S to be determined iteratively in order to determine from this a control signal parameter value averaged over time. This is the case in particular when the update frequency of the control signal is higher than the required update frequency for the actuation of the energy storage modules 3. For example, the pulse-width-modulated digital signal can be modulated with a frequency of 100 kHz, while the switching frequency of the power electronics components of the energy storage modules 3 is 10 kHz. In this case, averaging over ten pulse width periods can be performed in order to be able to acquire a more robust average value for the value of the control signal parameter S.

By way of example, the control signal is used for actuating ten energy storage modules 3 in an energy supply branch Z of an energy storage device 1. The energy storage modules 3 can generate, for example, a module voltage of +/−50 V in a full-bridge circuit of the coupling devices 7. Thus, the energy supply branch Z can cover a voltage range of +/−500 V. Each of the energy storage modules can be configured for a specific branch voltage range. This configuration can be set via a control mode assignment in accordance with a configuration signal via a configuration line 8*d*. For example, a first of the energy storage modules 3 can be provided for a branch voltage range between 200 V and 250 V, i.e. in the case of a desired total voltage in the energy supply branch Z of below 200 V, the first of the energy storage modules 3 is kept permanently in a bypass state, in the case of a desired total voltage in the energy supply branch Z of above 250 V, the first of the energy storage modules 3 is switched permanently into the energy supply branch Z, and in the case of a desired total voltage in the energy supply branch Z of between 200 V and 250 V, the first of the energy storage modules 3 is actuated by corresponding clocking of the coupling device 7 in order to contribute an intermediate value of between 0 V and 50 V to the desired total voltage.

The assignment of the values of the control signal parameter S can comprise the following ranges, for example: in the range 21 between a pulse width of 0% and 2.5%, all of the energy storage modules 3 in the lower active short-circuit state (ASCS) can be bypassed. In the range 25 between a pulse width of 97.5% and 100%, all of the energy storage modules 3 in the upper active short-circuit state (ASCS) can be bypassed. These ranges can include a minimum range, with the result that the statistical short-circuit states can be assumed stably even when slight measurement or acquisition errors occur in system-related fashion.

All of the energy storage modules 3 can output a negative module voltage in the range 22 between a pulse width of 2.5% and 5%. In the range 24 between a pulse width of 95% and 97.5%, all of the energy storage modules 3 can output a positive module voltage. These two ranges 22 and 24 can be used for generating the maximum voltage of the energy supply branch Z.

In the range 25 between a pulse width of 5% and 95%, all of the intermediate values for the total voltage of between −500 V and +500 V can be encoded depending on the number of energy storage modules 3. All of the above-mentioned absolute values are of course merely by way of example, and other control mode assignments to control signal parameter ranges are likewise conceivable.

Furthermore, further actuation commands can also be transmitted to the driver devices 9 via the control signal, for example by cyclic meaningful changing of the pulse width within an update period or by changing the modulation frequency or other digital modulation types.

Figure 6:
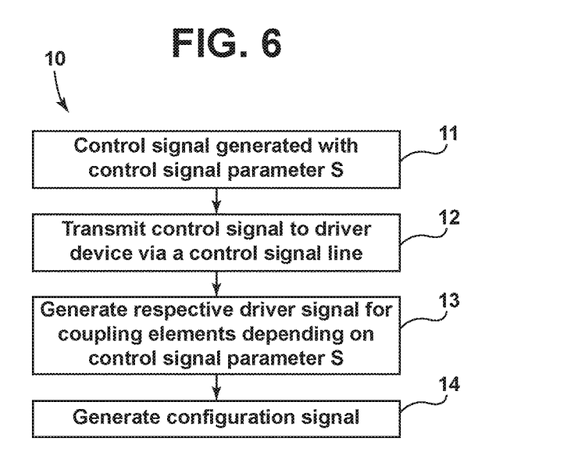
FIG. 6 shows a schematic illustration of a method for actuating coupling devices of an energy storage device in accordance with a further embodiment of the present invention.

FIG. 6 shows a schematic illustration of a method 10 for actuating coupling devices of an energy storage device, for example coupling devices 7 of the energy storage devices 1 as described in FIGS. 1 and 4. The method 10 can be implemented, for example, using the control device 8 in FIGS. 1 and 4.

The method 10 can have, as the first step 11, generation of a control signal which has a physical control signal parameter S, with a control mode for the driver devices 9 being encoded in the value of said control signal parameter. In a second step 12, transmission of the control signal to driver devices 9 via a control signal line 8*a* can then take place, which driver devices are assigned in each case to one of the energy storage modules 3 and are coupled to the in each case one of the energy storage modules 3 and which driver devices are configured to actuate the coupling elements 7*a*, 7*b*; 7*c*, 7*d* of the coupling devices 7 in accordance with a driver signal. In a third step 13, generation of a respective driver signal for the coupling elements 7*a*, 7*b*; 7*c*, 7*d* of the coupling devices 7 by means of the driver devices 9 takes place depending on the value of the control signal parameter S and a presettable control mode assignment.

Optionally, in a step 14, generation of a configuration signal can take place, which configuration signal is output to the driver devices 9 via a configuration line 8*d*, wherein the configuration signal configures the respective presettable control mode assignment of the driver devices 9.

The invention claimed is:

1. An energy supply system, comprising:
   an energy storage device, which has a multiplicity of energy storage modules, which are connected in series in at least one energy supply branch, each energy storage module including
   an energy storage cell module, which has at least one energy storage cell, and
   a coupling device including coupling elements, which are configured to switch the energy storage cell module selectively into the respective energy supply branch or to bypass said energy storage cell module; and
   a multiplicity of driver devices, which are assigned in each case to one of the energy storage modules and are coupled to, in each case, one of the energy storage modules, and which are configured to actuate the coupling elements of the coupling devices in accordance with a driver signal,
   a control device, which is coupled to the driver devices via a control signal line, and which is configured to output a control signal to the driver devices via the control signal line which control signal has a physical control signal parameter, with a control mode for the driver devices being encoded in the value of said control signal parameter; and
   a configuration line, which couples the control device to the driver devices,
   wherein the driver devices are configured to receive the control signal and to generate the respective driver signal depending on the value of the control signal parameter and a presettable control mode assignment, and
   wherein the control device is configured to output a configuration signal via the configuration line to the driver devices, which configuration signal configures the respective presettable control mode assignment of the driver devices.

2. The energy supply system as claimed in claim 1, wherein the control signal is a serially transmitted digital bit string, and wherein the physical control signal parameter is encoded in the bit string.

3. The energy supply system as claimed in claim 1, further comprising:
   a reset line, which couples the control device to the driver devices,
   wherein the control device is configured to output a reset signal via the reset line to the driver devices, which reset signal sets all of the coupling elements of the coupling devices to the open state.

4. The energy supply system as claimed in claim 1, further comprising:
   a feedback line which, together with the control signal line, forms a feedback loop for the control device,
   wherein the control device is configured to receive the control signal via the feedback line and to check, depending on the fed-back control signal, whether the control signal is output fault-free to all of the driver devices and there is no defect in the control signal line.

5. The energy supply system as claimed in claim 1, wherein the control signal is a pulse-width-modulated digital signal, and wherein the physical control signal parameter is the pulse width of the pulse-width-modulated digital signal.

6. The energy supply system as claimed in claim 1, wherein the control signal is a frequency-modulated digital signal, and wherein the physical control signal parameter is the frequency of the frequency-modulated digital signal.

7. The energy supply system as claimed in claim 1, wherein the control signal is an analog voltage signal, and wherein the physical control signal parameter is the voltage value of the analog voltage signal.

8. A method for actuating coupling devices of an energy storage device, which has a multiplicity of energy storage modules connected in series in at least one energy supply branch, which energy storage modules each include an energy storage cell module, which has at least one energy storage cell, and a coupling device having coupling elements, which are configured to switch the energy storage cell module selectively into the respective energy supply branch or to bypass said energy storage cell module the method comprising the following steps:
   generating a control signal, which has a physical control signal parameter, with a control mode for the driver devices being encoded in the value of said control signal parameter;
   transmitting the control signal to driver devices, which are each assigned to one of the energy storage modules and are coupled to, in each case, one of the energy storage modules, and which are configured to actuate the coupling elements of the coupling devices in accordance with a driver signal, via a control signal line,
   generating a respective driver signal for the coupling elements of the coupling devices by means of the driver devices depending on the value of the control signal parameter and a presettable control mode assignment; and
   generating a configuration signal, which is output via a configuration line to the driver devices, wherein the configuration signal configures the respective presettable control mode assignment of the driver devices.

9. The method as claimed in claim 8, wherein the control signal is a serially transmitted digital bit string, and wherein the physical control signal parameter is encoded in the bit string.

10. The method as claimed in claim 8, wherein the control signal is a pulse-width-modulated digital signal, and wherein the physical control signal parameter is the pulse width of the pulse-width-modulated digital signal.

11. The method as claimed in claim 8, wherein the control signal is a frequency-modulated digital signal, and wherein the physical control signal parameter is the frequency of the frequency-modulated digital signal.

12. The method as claimed in claim 8, wherein the control signal is an analog voltage signal, and wherein the physical control signal parameter is the voltage value of the analog voltage signal.

* * * * *